United States Patent [19]

Finnigan

[11] Patent Number: 4,671,736
[45] Date of Patent: Jun. 9, 1987

[54] APPARATUS FOR THE CONTROL OF AN AERIAL PROPELLER

[75] Inventor: Henry W. Finnigan, Lisburn, Northern Ireland

[73] Assignee: Short Brothers Limited, Belfast, Northern Ireland

[21] Appl. No.: 566,983

[22] Filed: Dec. 30, 1983

[30] Foreign Application Priority Data

Jan. 5, 1983 [GB] United Kingdom ............... 8300101

[51] Int. Cl.⁴ .................................... B64C 11/40
[52] U.S. Cl. .................................... 416/46; 416/48; 416/50
[58] Field of Search ................. 416/45, 46, 48, 50

[56] References Cited

U.S. PATENT DOCUMENTS

| | | | |
|---|---|---|---|
| 2,722,985 | 11/1955 | Biermann | 416/46 |
| 2,745,500 | 5/1956 | Moore et al. | 416/49 X |
| 2,756,012 | 7/1956 | Moore et al. | 416/45 X |
| 2,798,563 | 7/1957 | Miller et al. | 416/45 |
| 2,809,702 | 10/1957 | Lambeck et al. | 416/48 |
| 2,943,686 | 7/1960 | Luiz et al. | 416/50 |
| 2,980,188 | 4/1961 | Allen et al. | |
| 2,986,222 | 5/1961 | Bierman | 416/46 |
| 3,020,007 | 2/1962 | Hine | 416/48 X |
| 3,115,938 | 12/1963 | Fischer et al. | 416/48 |
| 3,207,227 | 9/1965 | Timewell | 416/46 |
| 3,387,663 | 6/1968 | Barnes et al. | 416/48 |
| 3,389,641 | 6/1968 | Barnes | 91/366 |
| 3,439,745 | 4/1969 | Gaubis et al. | 416/154 X |

FOREIGN PATENT DOCUMENTS

| | | | |
|---|---|---|---|
| 614951 | 12/1948 | United Kingdom | 416/30 |
| 615757 | 1/1949 | United Kingdom. | |
| 808559 | 2/1959 | United Kingdom | 416/162 |
| 821414 | 10/1959 | United Kingdom. | |
| 876954 | 9/1961 | United Kingdom. | |
| 948339 | 1/1964 | United Kingdom. | |
| 1097924 | 1/1968 | United Kingdom. | |

OTHER PUBLICATIONS

Search Report for the corresponding European Patent Office application, EP 84 30 0026.
Search Report for the corresponding British application, GB 8400069.

Primary Examiner—Everette A. Powell, Jr.
Attorney, Agent, or Firm—Kenyon & Kenyon

[57] ABSTRACT

Apparatus for controlling the pitch of the blades of a variable pitch, governor controlled, aerial propeller of which the pitch of the blades is variable between a coarse pitch limit and a fine pitch limit to match the torque of its prime mover has holding means (A) to maintain a forward thrust-generating blade pitch angle greater than the fine pitch limit with the prime mover idling as when an aircraft propelled by the propeller is taxi-ing whereby the propeller rotates more slowly, and hence more quietly, than it would otherwise. Preferably the holding means is effective by actuating a lock pitch solenoid valve (21) and an autofeather valve (18).

6 Claims, 1 Drawing Figure

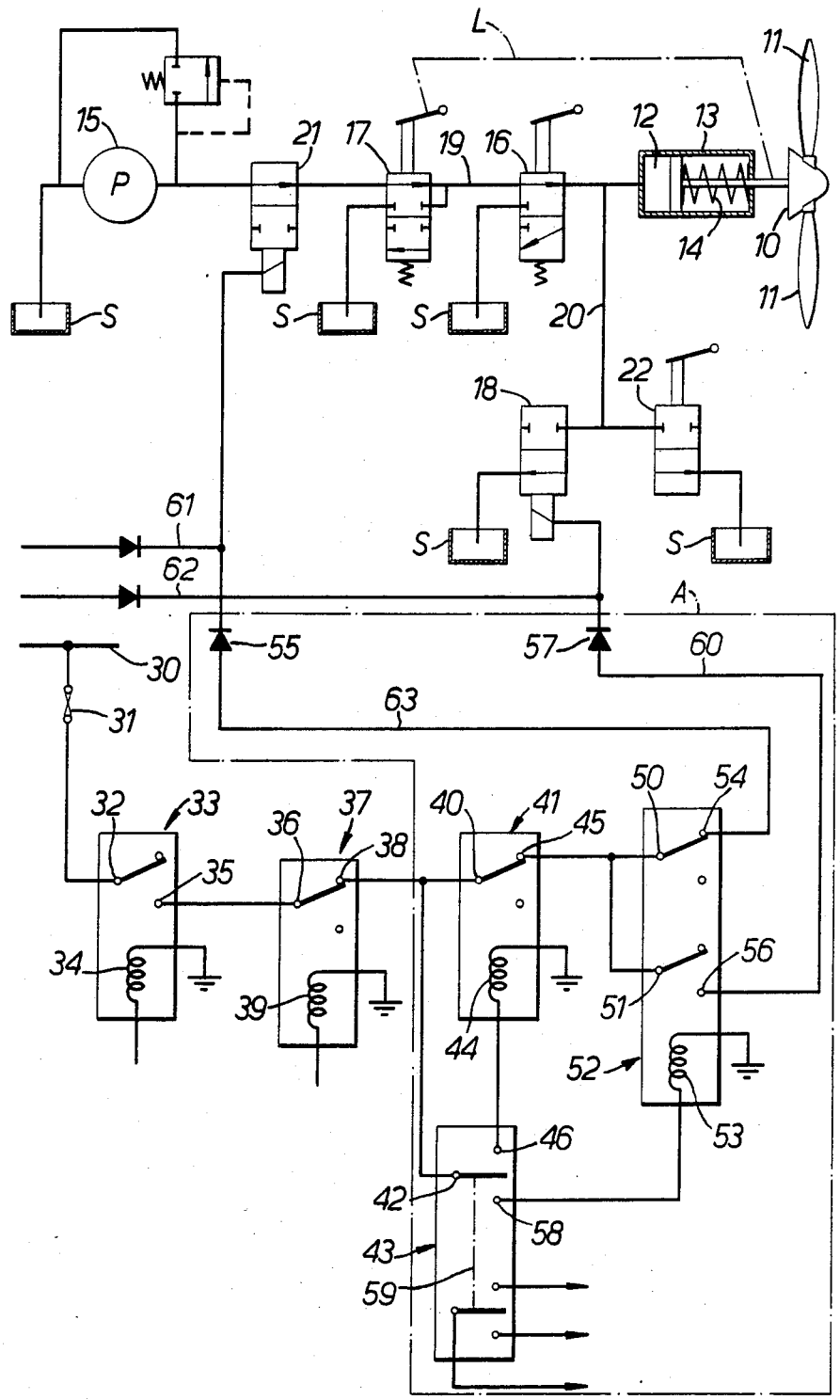

APPARATUS FOR THE CONTROL OF AN AERIAL PROPELLER

This invention relates to apparatus for controlling the pitch of the blades of a variable pitch, governor controlled aerial propeller of which the pitch of the blades is variable between a coarse pitch limit and a fine pitch limit to match the torque delivered by a prime mover to that consumed by the propeller.

Such apparatus often comprises a governor which senses changes in propeller speed and responds to such changes, when positive by increasing the pitch angle and vice versa, to maintain the propeller speed as closely as possible in accordance with a preselected working speed of the propeller.

Thus, when forward thrust is required, and the prime mover driving the propeller is set at a power level lower than would normally be selected for flight of the aircraft, for example, when the aircraft is required to taxi on the ground, the propeller blades will be at a safe minimum pitch as selected by the governor, in order that the propeller speed may attain as nearly as possible the preselected working speed.

Unfortunately, when an aircraft is taxi-ing, propellers running at or near working speed are noisy and sometimes generate a particularly undesirable "buzz-saw" tone. It would be preferable for the propellers to run much more slowly during taxi-ing.

One way of reducing propeller speed is to reduce engine power still further but this has a number of disadvantages known to those skilled in the art.

The present invention seeks to ameliorate or overcome these prior art disadvantages, and provides apparatus for controlling the pitch of the blades of a variable pitch aerial propeller, as set out hereinbefore, and and comprising holding means to hold the blades at a thrust-generating blade pitch angle greater than the fine pitch limit during a period when the prime mover is delivering a torque which would otherwise be insufficient to move the blade angle off the fine pitch limit whereby, with the prime mover idling, the propeller rotates more slowly than otherwise, while delivering useful thrust.

One way of providing the holding means is to provide the governor as a dual mode governor, the selector means shifting it between the normal working mode and a taxi-ing mode in which latter mode it functions to maintain the propeller speed as closely as possible in accordance with a predetermined taxi-ing speed. The provision of a dual mode governor is, however, expensive.

Preferably, therefore, the holding means comprises supplementary switching means to modify the operation of already present hydraulic valves which control flow of pressurised hydraulic fluid to and from a propeller blade pitch change hydraulic actuator.

In one known aircraft engine layout the governor comprises a valve in a hydraulic line connecting such an actuator with a hydraulic pump, and other valves are provided as a matter of established practice in the line, in particular, a so-called "lock-pitch" solenoid valve which when actuated cuts off any further flow of fluid from the pump towards the actuator and a so-called "autofeather" valve which when actuated connects the hydraulic actuator to sump.

In the known layout, flow of fluid to the actuator serves to bring the propeller blades to ever finer pitch so that, as engine power is reduced, the governor valve will tend to remain open for flow of fluid to the actuator. However, the blades are biased to the feathered, i.e. fully coarsened, pitch so that when the actuator is connected to sump the blades move to the feathered disposition.

In such a layout, the desired slow propeller speed in taxi-ing can be achieved in accordance with the invention by manipulation of the lock-pitch solenoid and autofeather valve, as is explained further hereinafter with reference to the accompanying drawing, given by way of example, which is a diagram of the electrical and hydraulic circuits of an apparatus according to the present invention, as installed in a turbo-prop aircraft.

In the drawing a variable-pitch propeller 10 has blades 11, the pitch of which is caused to vary by flow of hydraulic fluid 12 into and out of a hydraulic actuator 13. The blades are biased by a counterweight on each blade and by a spring 14, to a fully feathered disposition, and flow of fluid 12 into the actuator moves them against the biasing force to an increasing fine pitch.

Flow of fluid 12 from a hydraulic pump 15 to the actuator 13 is controlled by a governor valve 16 the operation of which will be familiar to those skilled in the art.

As engine power is reduced, the blades will be driven, by flow of fluid into the actuator, to an ever finer pitch. A beta valve 17 sets a lower limit to the pitch, a mechanical link L between the valve and the propeller causing movement of the value member in the beta valve, at the minimum pitch, to shut off further flow of fluid from the pump to the actuator.

With the engine on reduced power, the blades can be, moved to a coarser pitch by energising the solenoid in an autofeather valve 18, allowing fluid 12 in the actuator 13 to go to sump S and the biasing of the propeller blades to increase the pitch thereof.

However, this pitch increase will result in opening of the beta valve so that flow of fluid from the pump towards the actuator can resume. By appropriate sizing the relative cross-section of the flow passage 19 from the pump P to the actuator 13 and the passage 20 through the autofeather valve 18, it is ensured that all of the flow downstream of the beta valve passes to the sump S, and the pressure within it is not sufficient to move the actuator to a finer pitch setting.

Between the beta valve 17 and the pump 15 is located a lock-pitch solenoid valve 21. This is a normal component of the known layout, provided for the purpose of shutting off flow of fluid 12 to the actuator 13 if the propeller blades should be approaching a dangerously fine pitch, e.g. if the beta valve has failed to operate. However, the lock-pitch solenoid valve is energised in the present proposal, as explained below, to shut off fluid flow when blade pitch is at a chosen value, intermediate the fine limit pitch and the feathered pitch, deemed appropriate for taxi-ing.

The hydraulic circuit includes a feathering valve which is manually operable by the pilot of the aircraft, or other vehicle or equipment on which the propeller is mounted. The feathering valve in a so-called "Type 1" governor layout, is the governor valve 16. In a so-called "Type 2" governor layout, however, it is a separate feathering valve 22.

Turning now to the electrical circuit shown in the lower half of the drawing, power from a general services bus bar 30 is provided through a 5 amp fuse 31 to an input 32 of a first relay 33, which is normally open but which closes upon energisation of a coil 34, to provide a signal at an output 35. Energisation of the coil 34 occurs upon locking of the aircraft flight control surfaces (not shown - often referred to as "gust locking").

The signal at the output 35 is fed to an input 36 of a second relay 37 which is normally closed, so as to feed the signal to an output 38. Energising of an associated coil 39 to open the relay occurs when the propeller blades move into any pitch setting finer than that set by operation of the beta valve.

The poles of the relays 33 and 37 are, in the embodiment shown, poles of relays already present in the layout but surplus to existing control requirements. In the existing layout, the coil 39 is energised at times when the propeller blades are in a dangerously fine pitch setting. Consequently, energising of the coil 39 is unlikely to occur in taxi-ing.

The output from the relay 37 is utilised as input to additional circuitry A which is used to hold the blade pitch at a required angle for quiet taxi-ing of the aircraft.

The signal from the output 38 is fed to the input 40 of a fine-setting relay 41 and the input 42 of a double throw selector switch 43. When a coil 44 of the fine-setting relay is not energised, the input 40 is connected to an output 45 of the relay. The connection is broken by energising the coil 44 by actuating the selector switch 43 to connect the input 42 to an output 46 feeding the coil 44.

From the output 45 the signal is fed to a first 50, and a second 51, input of a coarse-setting relay 52 which has a coil 53. While the coil is not energised, the input 50 is connected to an output 54 connected to the lock-pitch solenoid valve 21 by a lead 63 via a diode 55. Accordingly, with the selector switch 43 in a neutral position, current flows through the coil of the solenoid valve 21 thereby shutting off fluid 12 from the pitch change actuator 13.

The second input 51 of the relay 52 is connected to an output 56, which is connected to the autofeather valve 18 by a lead 60 via a diode 57, only when the coil 53 is energised. This occurs when the input 42 of the switch 43 is connected to an output 58 connected to the coil 53.

As mentioned above, the lock-pitch valve 21 and autofeather valve 18 continue to serve the respective functions for which they are installed in the prior art apparatus. Accordingly, the lead 63 is connected to a lead 61 which connects the lock-pitch valve to a pitch indication and secondary stop circuit, known per se. Also, the lead 60 is connected to a lead 62 which connects the autofeather valve 18 to an autofeather circuit, known per se.

In use of the device, the pilot performs the tasks he would previously have carried out prior to taxi-ing. He then reduces propeller noise by moving an actuating member 59 of the switch to connect the input 42 to the output 58. This triggers relay 52, and so provides current to the autofeather valve 18 to open it and terminates flow of current to the lock-pitch solenoid valve 21. Fluid 12 flows out of the actuator 13 to sump S through the valve 18. As the blades move off their fine pitch limit the beta valve opens, and fluid 12 flows from the pump 15 to sump S through the valve 18. This latter flow is small because the pump is engine-driven and the engine is running relatively slowly, and the pressure developed is insufficient to prevent movement of the actuator 13 to a coarser setting.

As the blade pitch increases the propeller speed falls in proportion. When a desired speed is reached, the pilot moves the actuating member 59 of the switch 43 to its neutral position whereupon current flows once more to the lock-pitch valve 21 to close it, and ceases to flow to the autofeather valve 18 to close that valve too, so that the blade setting becomes fixed.

A finer pitch is achieved by moving the selector switch member 59 so as to connect the input 42 with the output 46, with the result that the relay 41 is actuated, and current ceases to flow to the lock-pitch valve 21, it opens, and fluid 12 flows into the actuator 13. The autofeather valve 18 remains unactuated and closed so the actuator 13 moves to a finer setting, which is held by release of the member 59 to the neutral position.

The switch 43 is shown with a second, identical set of poles, actuated by a common member 59. This second set is for a second engine and propeller, having control components identical to those shown in the drawing for the first engine.

Although the selector switch 43 is shown with its neutral position corresponding to its middle position, it may be convenient in practice to provide the pilot of an aircraft fitting with the apparatus with a selector switch in which a forward position of the actuating member 59 corresponds to the neutral position, the mid position to the "coarser pitch" setting and a rearward position to the "reduce pitch" setting.

In the illustrated embodiment, the propeller is one with reversible pitch and means (not shown, and known per se) are provided to over-ride the normal forward thrust operation of the hydraulic pitch control apparatus and move the pitch of the propeller blades to a reverse thrust orientation when desired.

I claim:

1. In apparauts for controlling the pitch angle of the blades of a variable pitch propeller of a variable pitch propeller system to a quiet taxi-ing regime of pitch angles, the variable pitch propeller being adapted to be connected to an aero engine for propulsion of an aircraft and having means for movably mounting the blades for a change of the pitch angle of the blades, the variable pitch propeller system having a blade pitch change actuator connected to the blade mounting means for adjusting the pitch angle of the blades finer or coarser, a flight regime valve connected to the pitch change actuator, a flight regime governor connected to the flight regime valve and responsive to the aero engine generating at least a "flight idle" power output to enable the flight regime valve to control the pitch change actuator to adjust the pitch angle of the blades to pitch angles within the flight regime of blade pitch angles for maintaining a selected propeller speed automatically regardless of variations in engine power output, a beta regime valve coupled to the pitch change actuator for controlling the pitch change actuator to adjust the pitch angle of the blades to pitch angles in a beta regime of pitch angles when the aircraft is on the ground, the beta regime of blade pitch angles being less than those of the flight regime of blade pitch angles, a lock-pitch valve connected to the pitch change actuator, the lock-pitch valve when activated arresting the blade pitch actuator, means connected to the lock-pitch valve and responsive to a control signal indicative of a dangerously fine pitch angle of the blades for operating the lock-pitch valve to prevent the pitch change actuator from adjusting the pitch angle of the blades to a finer pitch, an autofeather valve connected to the pitch change actuator, and means connected to the autofeather valve and responsive to an autofeather control signal for operating the autofeather valve to enable the —pitch change actuator to adjust the pitch angle of the blades to a pitch angle corresponding to a full feathering pitch angle, the improvement comprising override switching means connected to the means for operating the autofeather valve and the means for operating the lock-pitch valve, the override switching means being selective in response to a pilot switching to a quiet taxi-ing regime when the engine is generating a "ground idle" power output for activating the lock-pitch valve operating means and the autofeather valve operating means to enable the pitch change actuator to adjust the pitch angle of the blades to pitch angles within a quiet taxi-ing regime of blade pitch angles which are greater than the blade pitch angle at the upper end of the beta range and less than the pitch angle at full feathering pitch, thereby to reduce the speed of the propeller while maintaining forward thrust for quiet taxi-ing.

2. In apparatus according to claim 1, wherein the blade pitch change actuator is a hydraulic actuator responsive to fluid flowing into it to make the blade pitch angle finer and responsive to fluid flowing out of it to make the blade pitch angle coarser, wherein the variable pitch propeller system has a hydraulic fluid supply circuit for transmitting hydraulic fluid to the actuator, wherein the flight regime value is a hydraulic valve connected in the supply circuit to control the flow of hydraulic fluid to and from the actuator wherein the beta regime valve is a hydraulic valve, connected in the supply circuit, wherein the variable pitch propeller system includes a feedback linkage from the blade mounting means connected to the beta regime valve, the beta regime valve being adapted to be operated by the feedback linkage to control the flow of hydraulic fluid to and from the actuator, wherein the lock-pitch valve is a hydraulic valve connected in the fluid supply circuit and operative when closed by the lock-pitch valve operating means to stop the flow of hydraulic fluid to the actuator, and wherein the autofeather valve is a hydraulic valve connected in the fluid supply circuit, and operative when opened by the autofeather valve operating means to enable fluid to flow from the actuator through the autofeather valve, the improvement comprising the override switching means being adapted to selectively activate the lock-pitch valve operating means and the autofeather valve operating means to adjust the flow of fluid to and from the actuator.

3. In apparatus as claimed in claim 2, wherein the override switching means includes first and second relays, the first relay having an input and an output and the second relay having two inputs and an output, the first and second relays in response to an input signal providing output signals for activating the lock-pitch valve and the autofeather valve, the first relay when unactivated providing an output signal to first and second inputs of the second relay, the second relay when unactivated providing an output signal to the lock-pitch valve and, when activated, to the autofeather valve, and wherein the override switching means further comprises a selector switch for activating the first and second relays, the switch having a neutral position in which it leaves the first and second relays unactivated to provide an output signal to the lock-pitch valve to close said valve, a coarser pitch position in which the switch leaves the first relay unactivated and activates the second relay thereby to provide an output signal to the autofeather valve to open said valve to enable fluid from the blade pitch change actuator to flow through the valve to increase the blade pitch angle, and a finer pitch position in which the switch activates the first relay thereby to terminate the output signal to the second relay and hence to the lock-pitch valve to open the lock-pitch valve and to the autofeather valve to close the autofeather valve to enable fluid to flow to the blade pitch change actuator to reduce the blade pitch angle.

4. In apparatus according to claim 3, wherein the second relay when activated cuts off the output to the lock-pitch valve to open the lock-pitch valve and wherein the fluid supply circuit has flow passages so sized that the fluid delivered by the fluid supply circuit passes to the autofeather valve.

5. In apparatus as claimed in claim 1 in which the improvement comprises the override switching means including a selector switch which is movable from a neutral disposition to a coarsening disposition for activating the autofeather valve operating means to open said autofeather valve until the blade pitch angle is as course as required in the quiet taxi-ing range, and which is movable from the neutral disposition to a reducing disposition for activating the pitch lock valve operating means to open the lock-pitch valve until the blade pitch angle is as fine as required in the quiet taxi-ing range.

6. In apparatus as claimed in claim 1, in which the variable pitch propeller system has means for locking the flying controls and in which the improvement comprises the overrride switching means including relays which provide from an input signal output signals to activate the lock-pitch valve operating means and the autofeather valve operating means and comprises means for providing the input signal in response to the means for locking the flying controls of the aircraft being activated by the pilot.

* * * * *